Dec. 5, 1967 R. H. NORMAN 3,356,860

MEMORY DEVICE EMPLOYING PLURALITY OF MINORITY-CARRIER STORAGE EFFECT TRANSISTORS INTERPOSED BETWEEN PLURALITY OF TRANSISTORS FOR ELECTRICAL ISOLATION

Filed May 8, 1964 2 Sheets-Sheet 1

INVENTOR.
ROBERT H. NORMAN

BY Jack M. Wiseman

ATTORNEY

MEMORY DEVICE EMPLOYING PLURALITY OF MINORITY-CARRIER STORAGE EFFECT TRANSISTORS INTERPOSED BETWEEN PLURALITY OF TRANSISTORS FOR ELECTRICAL ISOLATION

Filed May 8, 1964 2 Sheets-Sheet 2

INVENTOR.
ROBERT H. NORMAN

BY Jack M. Wiseman

ATTORNEY 3,356,860

MEMORY DEVICE EMPLOYING PLURALITY OF MINORITY-CARRIER STORAGE EFFECT TRANSISTORS INTERPOSED BETWEEN PLURALITY OF TRANSISTORS FOR ELECTRICAL ISOLATION

Robert H. Norman, Los Altos, Calif., assignor to General Micro-Electronics Inc., a corporation of Delaware Filed May 8, 1964, Ser. No. 365,913
5 Claims. (Cl. 307—88.5)

The present invention relates in general to memory devices, and more particularly to a miniaturized memory device. By the term "memory device" is meant a circuit, such as a shift register, which stores a pulse signal temporary for the purpose of delaying said signal between an input and an output of said circuit.

There has been a great need for the miniaturization of memory devices. It has been found that the miniaturization of conventional memory devices did not result in a reduction of the power requirements or in a lessening of the complex nature of the electronic circuitry associated therewith. For a fact, the design difficulty encountered in the miniaturization of magnetic memory devices arises out of the complex electronic circuitry associated therewith.

Accordingly an object of the present invention is to provide an improved miniaturized memory device. Other objects are:

(1) To provide a semiconductor memory device;

(2) To provide an integrated semiconductor memory device;

(3) To provide a memory device with reduced power requirements;

(4) To provide a memory device that is miniaturized without sacrificing reliability, (5) To provide a memory device that has less complicated electronic circuitry;

(6) To provide a miniaturized memory device that is more economical to manufacture without sacrificing reliability;

(7) To provide a memory device that is operated sequentially in accordance with clock pulse synchronizing signals and without cyclic addressing circuitry;

(8) To provide an integrated semiconductor multi-bit memory device that operates sequentially in clock synchronism;

(9) To provide a multi-bit memory device that is cascaded without interface circuitry and with minimum degradation;

(10) To provide a miniaturized memory device that receives logic level input signals and drives logic level circuits; and

(11) To provide a miniaturized memory device that does not employ resistance-capacitance timing networks;

Other and further objects and advantages of the present invention will be apparent to one skilled in the art from the following description.

DRAWINGS

Figure 1:
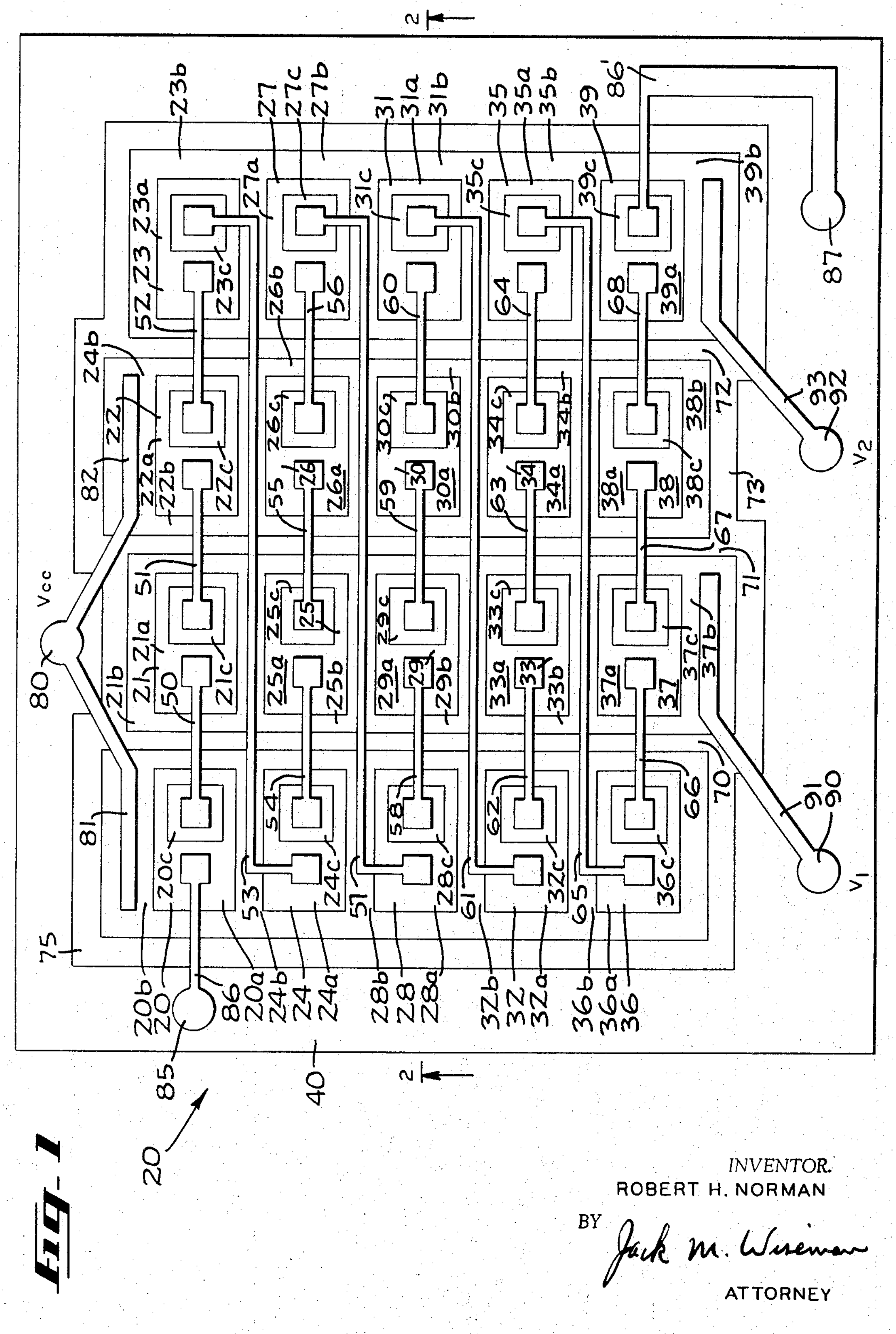
FIG. 1 is a diagrammatic plan view of the memory device of the present invention.
Figure 2:
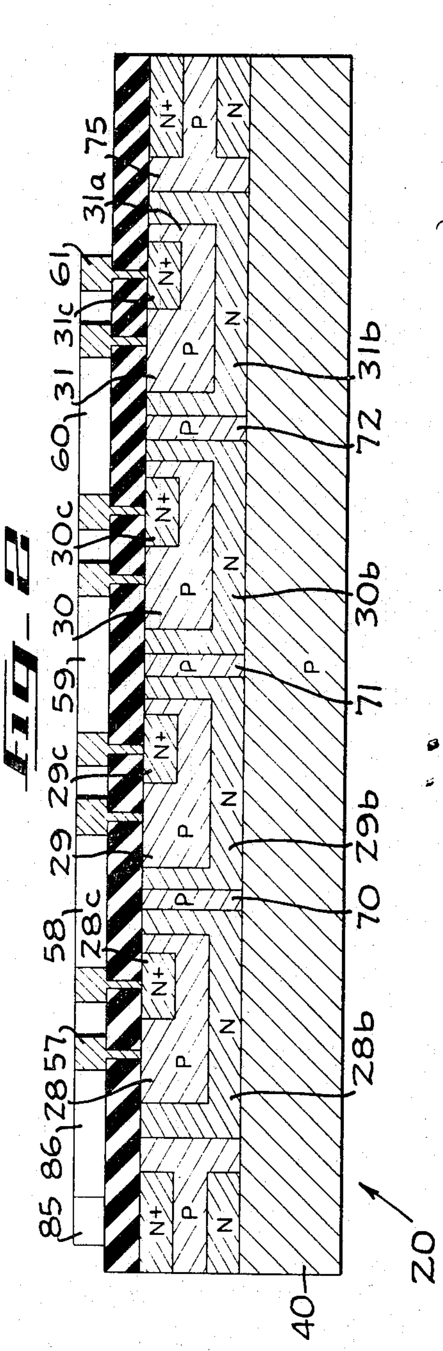
FIG. 2 is a vertical sectional view taken along line 2—2 of FIG. 1.

Illustrated in FIGS. 1 and 2 is the memory device 10 of the present invention, which may be more particularly referred to as a multi-bit memory device. The memory device 10 comprises a plurality of interconnected semiconductor devices 20–39 embodied in a single or integral semiconductor body or slice 40, such as a P-type silicon monocrystalline substrate or wafer. Thin metallic films, such as aluminum thin film conductors 50–68, are provided for the interconnections between the semiconductive devices 20–39, whereby the semiconductive devices 20–39 are connected in cascade or in series to form a link for successive and sequential operation.

Each semiconductor device, such as semiconductor devices 20–39, comprises a base region, a collector region and an emitter region. For purpose of clarity and simplicity, the base regions of the semiconductor devices 20–39 are designated by the reference numeral of the associated semiconductor device with a suffix *a*. For example, the base region of the semiconductor device 28 is designated 28*a*. In the preferred embodiment, the base regions 20*a*–39*a* of the semiconductor devices 20–39, respectively, are of P-type silicon.

Similarly, the collector regions of the semiconductor devices 20–39 are designated by the reference numeral of the associated semiconductor device with a suffix *b*. For example, the collector region of the semiconductor device 29 is designated 29*b*. In the preferred embodiment, the collector regions 20*b*–39*b* of the semiconductor devices 20–39, respectively, are of N-type silicon. The emitter regions of the semiconductor devices 20–39 are designated by the reference numeral of the associated semiconductor device with a suffix *c*. By way of example, the emitter region of the semiconductor device 30 is designated 30*c*. The emitter regions 20*c*–39*c* of the semiconductor devices 20–39, respectively, are of N+ type silicon.

To achieve electrical isolation between the semiconductive structures of the semiconductor devices 20–39 that are directly interconnected or electrically connected for successive operation by the aluminum film conductors 50–68, isolation grids 70–72 are interposed therebetween. Surrounding the peripheral walls of the semiconductor devices 20–39 is an isolation region 73. In the preferred embodiment, the isolation grids 70–72 and the isolation region 74 are formed of P-type silicon.

The manufacturing processes for incorporating the semiconductor devices 20–39, the aluminum film conductors 50–68 and the isolation grids 70–72 on the integral semiconductor (as well as the other aluminum surface connectors), body 40 are well-known in the art.

Figure 3:
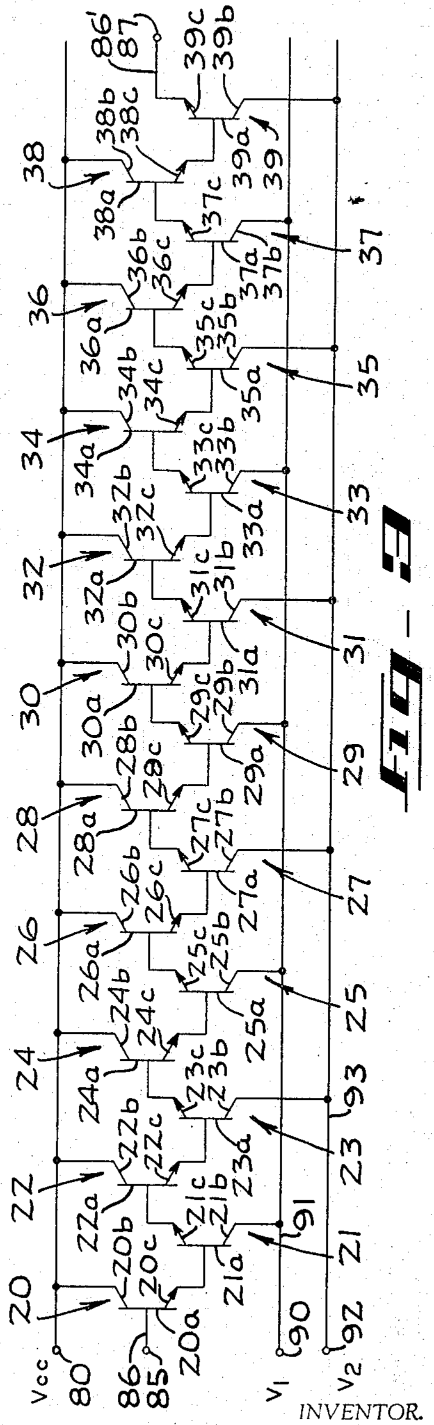
FIG. 3 is a schematic diagram of the memory device of the present invention.

Referring now to FIGS. 1 and 3, the even numbered semiconductor devices 20, 22, 24, 26, 28, 30, 32, 34, 36 and 38 are arranged in the emitter follow amplifier configuration. The odd numbered semiconductor devices 21, 23, 25, 27, 29, 31, 33, 35, 37 and 39 are in series with the above enumerated even numbered semiconductor devices, respectively. The even numbered semiconductor devices 20, 24, 28, 32 and 36 are aligned transversely and are isolated with regard to the semiconductor regions thereof from the transversely aligned odd numbered semiconductor devices 21, 25, 29, 33 and 37 by the isolation grid 70. In a like manner, the isolation grid 71 isolates the last enumerated transversely aligned odd numbered semiconductor devices from the transversely aligned even numbered emitter follower semiconductor devices 22, 26, 30, 34 and 38 with respect to the semiconductive regions thereof. Lastly, the isolation grid 72 isolates the aligned even numbered semiconductor devices 22, 26, 30, 34 and 38 from the aligned odd numbered semiconductor devices 23, 27, 31, 35 and 39.

Connected to a metal pad 80 (FIG. 1), such as an aluminum film pad, is an external source of collector voltage $V_{cc}$ (FIG. 3). The pad 80 is connected to the collectors 20*b*, 22*b*, 24*b*, 26*b*, 28*b*, 30*b*, 32*b*, 34*b*, 36*b*, and 38*b*, of the emitter followers 20, 22, 24, 26, 28, 30, 32, 34, 36 and 38, respectively, over metal film strips, such as aluminum film strips 81 and 82 (FIG. 1).

The signals to be stored or the input signals for the memory device 10, which may be of logic level input signals, are impressed on a metal pad 85, which signals are transmitted to the base 20*b* of the emitter follower 20 over a metal conductor, such as aluminum film strip 86.

The stored output signals suitable for driving logic level circuits are transmitted by the memory device 10 over a metal conductor 86', which feeds the output signals to a terminal, pad 87. The conductor film strip 86' is connected to the emitter 39*c* of the semiconductor device 39.

Figure 4:
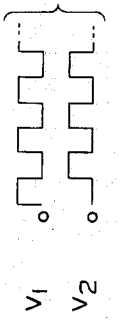
FIG. 4 is a graphic representation of the clock pulse synchonizing signals impressed on the memory device of the present invention.

Impressed on the collectors of the semiconductor devices 21, 25, 29, 33 and 37, respectively, by way of a metal pad 90 and a metal conductor 91 are pulses $V_1$, and impressed on the collectors of semiconductor devices 23, 27, 31, and 35 are 180° out-of-phase pulses $V_2$. Pulse train $V_1$ and $V_2$ are shown in FIG. 4.

With regard to the odd-numbered semiconductor devices 21, 23, 25, 27, 29, 31, 33, 35, 37 and 39, the base-collector junctions thereof are rectifying P–N junctions that function as storage diodes when driven to saturation. On the other hand, the base-emitter junctions thereof are rectifying P–N+ junctions that function as high speed coupling diodes.

In the operation of the memory device 10, a constant voltage $V_{cc}$ is impressed on the collectors of the emitter followers 20, 22, 24, 26, 28, 30, 32, 34, 36 and 38. Further, clock synchronizing pulse signal $V_1$ is fed to the collectors of the alternate odd-numbered semiconductor devices 21, 25, 29, 33, and 37. Simultaneously, clock synchronizing pulse signal $V_2$ is transmitted to the collectors of the remaining odd-numbered semiconductor devices 23, 27, 31, 35 and 39.

An input signal pulse $S_1$ (not shown) to be stored is fed to the base 20*a* of the emitter follower 20. While the synchronizing pulse signal $V_1$ is in the minimum potential half of its cycle, minority carriers are conducted for storage in the semiconductor device 21 through the diode junction 21*a*–21*b* thereof. The magnitude of the stored minority carriers in the semiconductor device 21 is representative of the magnitude of the signal $S_1$.

When the synchronizing pulse signal $V_1$ is at a maximum potential, the minority carriers stored in the semiconductor device 21 flow in the reverse direction through the storage diode junction 21*a*–21*b* and then advance through the coupling diode junction 21*a*–21*c* of the conductor device to impress the signal $S_1$ on the base 22*a* of the emitter follower 22. While the synchronizing pulse $V_1$ is at a maximum potential, the synchronizing pulse $V_2$ is at a minimum potential. Therefore, minority carriers stored minority carriers in the semiconductor device 23 through the diode junction 23*a*–23*b*. The magnitude of the stored minority carriers in the semiconductor device 23 is representative of the magnitude of the signal $S_1$, which was impressed on the base 22*a* of the emitter follower 22. In this manner, a current pulse signal, such as $S_1$, is propagated in clock synchronism through the chain until fed to the output of the semiconductor device 39.

A short time after the first input signal pulse $S_1$ has been supplied, a second input signal pulse $S_2$ may be fed to the base 20*a* of the emitter follower 20 and will be propagated in clock synchronism through the chain until fed to the output of the semiconductor device 39 in the manner described for the signal $S_1$. The advancement of the stored signals through the memory device 10 is slaved to the timing of clock synchronizing pulses and advances through the semiconductor devices in synchronism with the clock pulses.

In the exemplary embodiment, the magnitudes of the various voltages employed in the operation of the memory device 10 are as follows:

| | Volts |
|---|---|
| $V_{cc}$ | +3 |
| $V_1$ | 0 to +3 |
| $V_2$ | 0 to +3 |
| $S_1$ | 0 to +3 |

While a ten bit memory device has been described for purposes of simplicity, in actual practice a twenty bit memory device will be preferably employed. However, the construction and operation will be similar to that described for the memory device 10.

It is to be understood that modifications and variations of the invention disclosed herein may be restored to without departing from the spirit of the invention and the scope of the appended claims:

Having thus described my invention, what I claim as new and desire to protect by Letters Patent is:

1. A memory device comprising a semiconductor body, said semiconductor body being formed with a plurality of semiconductor devices, means on said semiconductor body for connecting said semiconductor devices in cascade, each of said semiconductor devices being formed with a rectifying P–N storage junction for conducting and storing minority carriers, each of said semiconductor devices also being formed with a rectifying P–N coupling junction for conducting current therethrough for transmission to a succeeding semiconductor device, means for impressing a first synchronizing pulse signal on alternate ones of said semiconductor devices, means for impressing a second synchronizing pulse signal on the semiconductor devices interposed between said alternate semiconductor devices, said second synchronizing pulse signal being out of phase with said first synchronizing pulse signal, a plurality of emitter followers, one for each of said semiconductor devices, said semiconductor body being formed with said emitter followers, means on semiconductor body for connecting the output of each of said emitter followers to the rectifying P–N storage junction of its associated semiconductor device, means for impressing a signal to be stored on a leading one of said emitter followers, and means connected to a succeeding one of said semiconductor devices for conducting a stored output signal.

2. A memory device comprising a semiconductor body, said semiconductor device being formed with a plurality of semiconductor devices, means on said semiconductor body for connecting said semiconductor devices in cascade, each of said semiconductor devices including a base region, a collector region, and an emitter region, each of said base-collection regions forming a rectifying P–N storage junction for conducting and storing minority carriers, each of said base-emitter regions forming a rectifying P–N coupling junction for conducting current therethrough for transmission to a base region of the succeeding semiconductor device, a plurality of emitter followers, one for each of said semiconductor devices, said semiconductor body being formed with said emitter followers, each of said emitter followers being formed with a base region, a collector region, and an emitter region, means on said semiconductor body for connecting the emitter of each of said emitter followers to the base of its associated semiconductor device, means for applying a voltage to the collectors of said emitter followers, means for impressing a first synchronizing pulse signal on the collector regions of alternate ones of said semiconductor devices, means for impressing a second synchronizing pulse signal to the collector regions of semiconductor devices interposed between said alternate semiconductor devices, said second synchronizing pulse signal being out of phase with said first synchronizing pulse signal, means for feeding a signal to be stored on a base region of a leading one of said emitter followers to be transmitted to the base region of its associated semiconductor device to advance in succession through said semiconductor devices by first conducting minority carriers through the rectifying P–N storage junction of each successive semiconductor device for storage and then producing a current flow through the rectifying P–N coupling junction associated therewith for transmission to the base region of the succeeding emitter follower, and means connected to an emitter region of a succeeding one of said semiconductor devices for conducting a stored output signal.

3. A memory device comprising a semiconductor body, said semiconductor body being formed with a plurality of emitter followers, said semiconductor body also being formed with a plurality of semiconductor devices, each of said semiconductor devices being formed with a rectifying P–N storage junction, said semiconductor body being formed with isolating P–N junction means alternately interposed between said plurality of emitter followers and said plurality of semiconductor devices for electrically isolating said emitter followers from said semiconductor devices, and means on said semiconductor body for interconnecting said emitter followers with said semiconductor devices.

4. A memory device comprising a semiconductor body, said semiconductor body being formed with a plurality of groups of emitter followers, said semiconductor device also being formed with a plurality of groups of semiconductor devices to form alternate rows of emitter followers and semiconductor devices, each of said semiconductor devices being formed with a rectifying P–N storage junction, said semiconductor body being formed with isolating means interposed between said alternate rows of emitter followers and semiconductor devices, means on said semiconductor body interconnecting said emitter followers and said semiconductor devices in cascade, means for impressing a first synchronizing pulse signal on the semiconductor devices in one row of said rows of semiconductor devices, means for impressing a second synchronizing pulse signal on the semiconductor devices in another row of said rows of semiconductor devices, said second synchronizing pulse signal being out of phase with said first synchronizing pulse signal, means for feeding a signal to be stored to a leading one of said emitter followers, and means for conducting a stored signal from a succeeding semiconductor device of said semiconductor devices.

5. A memory device comprising a semiconductor body, said semiconductor body being formed with a plurality of groups of emitter followers, each of said emitter followers comprising a base region, a collector region, and an emitter region, said semiconductor body also being formed with a plurality of groups of semiconductor devices to form alternate rows of emitter followers and semiconductor devices, each of said semiconductor devices comprising a base region, a collector region, and an emitter region, each of said semiconductor device base-collector regions forming a rectifying P–N storage junction, each of said semiconductor device base-emitter regions forming a rectifying P–N coupling junction, said semiconductor device being formed with isolating means interposed between alternate rows of emitter followers and semiconductor devices, means on said semiconductor body interconnecting the emitter of each of said emitter followers with a base of the succeeding semiconductor device, means for applying a potential to the collector regions of said emitter followers, means for impressing a first synchronizing pulse signal on the collector regions of the semiconductor devices in one of said rows of semiconductor devices, means for impressing a second synchronizing pulse signal on the collector regions of the semiconductor devices in another row of said rows of semiconductor devices, said second synchronizing pulse signal being out of phase with said first synchronizing pulse signal, means for feeding a signal to be stored to the base region of a leading one of said emitter followers, and means for conducting a stored signal from the emitter region of a succeeding semiconductor device of said semiconductor devices.

References Cited

UNITED STATES PATENTS

| | | | |
|---|---|---|---|
| 2,991,374 | 7/1961 | De Miranda et al. | 307—88.5 |
| 3,029,366 | 4/1962 | Lehoves | 307—88.5 X |
| 3,070,711 | 12/1962 | Marcus et al. | 307—88.5 |
| 3,230,388 | 1/1966 | Hounsfield | 307—88.5 |

ARTHUR GAUSS, *Primary Examiner.*

J. HEYMAN, *Assistant Examiner.*